3,391,678
MOTIVE POWER SYSTEM
Philip G. Luckhardt, 200 Midland Ave.,
Wayne, Pa. 19087
Continuation-in-part of application Ser. No. 461,645,
June 7, 1965. This application Apr. 3, 1967, Ser.
No. 627,906
6 Claims. (Cl. 123—17)

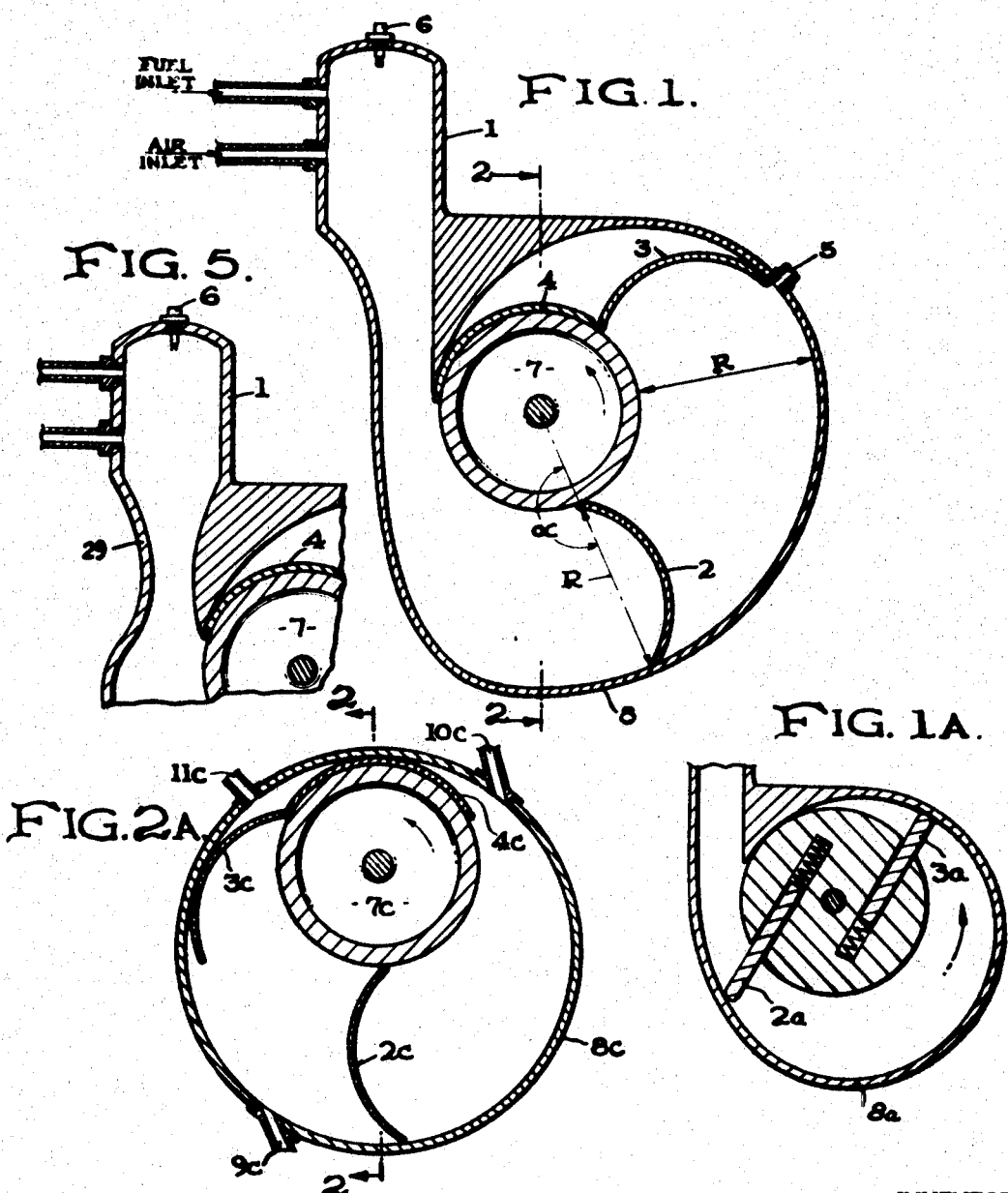

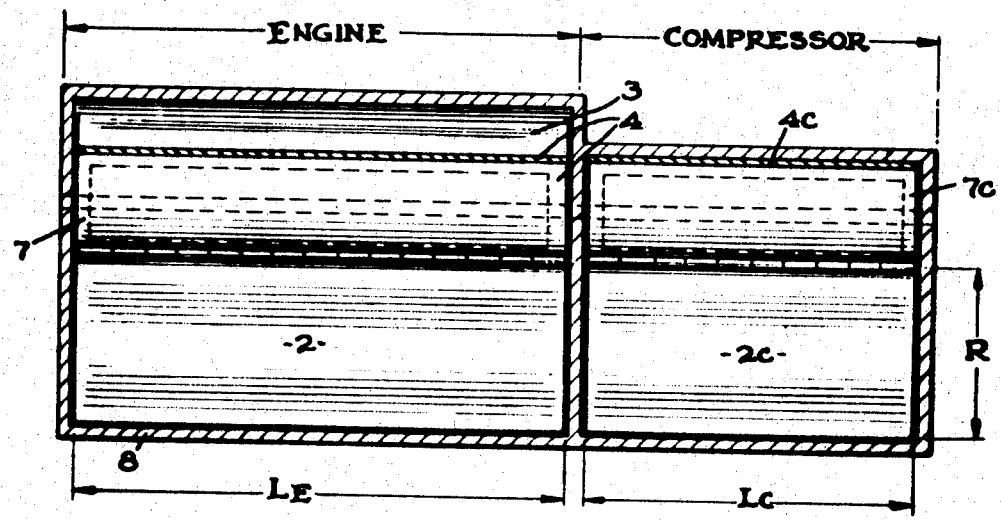
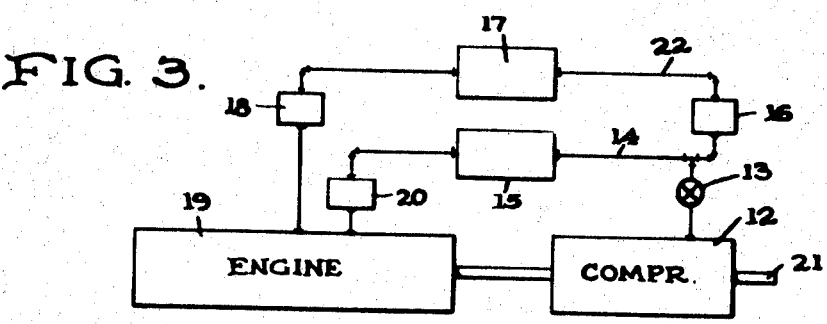
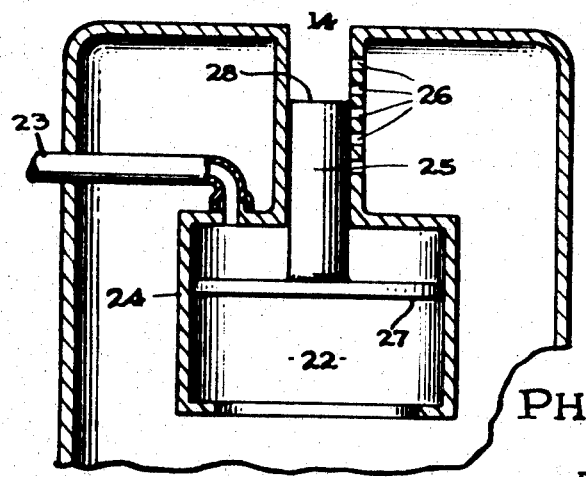
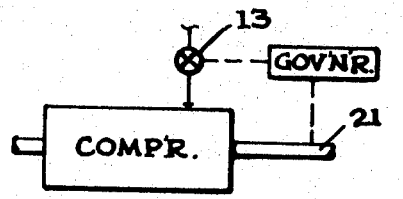
INVENTOR
PHILIP G. LUCKHARDT
BY Edwin E. Greigg
ATTORNEY

United States Patent Office 3,391,678
Patented July 9, 1968

ABSTRACT OF THE DISCLOSURE

A rotary engine and compressor system driven by a common shaft and having a pressure conduit leading from the compressor to a valve, a differential regulator having a conduit connecting the valve and the combustion chamber of the engine, a fuel supply conduit connected to the combustion chamber and a further feed conduit connecting the valve to the fuel supply.

This is a continuation-in-part application of Ser. No. 461,645, filed June 7, 1965, now Patent No. 3,312,203.

This invention relates to a rotary internal combustion engine having continuous combustion to carry on a relatively smooth operation and a continually operating compressor to feed oxidizing material to said engine. This type of engine is adapted to use hydrocarbons of lower octane rating than is customarily used in conventional four-cycle engines.

In this invention a separate compressor operates to feed oxidizing material into the explosion chamber. This compressor may be operated from the same power shaft as the engine or may be operated by a means separate and distinct therefrom. In the compressor outlet and the oxidizing material inlet to the engine, there are various regulating devices. These devices regulate the pressure and composition of the material being passed into the engine combustion chamber.

Accordingly, it is an object of this invention to provide a combustion chamber wherein gases are constantly being burned and there is a steady torque exerted upon the engine output shaft due to the constant pressure within the explosion chamber and the continuous ignition of fuel and oxidizing material.

It is another object of the invention to provide a positive displacement rotary compressor linked to the rotor of the engine.

It is another object of the invention to provide a novel fuel supply system.

It is a further object of the invention to provide a novel vane and rotor structure within the engine and also within the compressor.

It is a still further opject of the invention to show the use and structure of a novel pressure differential regulator.

It is yet another object of the invention to provide a novel means for effecting speed regulation of the engine.

It is still yet another object of the invention to provide a variable pressure regulator responsive to the rotational speed of the output shaft within the engine.

It is a further object of the invention to provide operation of the engine at high thermal efficiencies.

Other objects and advantages will become apparent upon a further reading of the following detailed description taken in conjunction with the drawings, in which:

FIG. 1 is a vertical section showing the engine casing housing a rotor and explosion and expansion chambers;

FIG. 1A is a partial vertical section showing a modification of the vane structure shown in FIG. 1;

FIG. 2 is a cross-sectional view taken along the line 2—2 of FIG. 1 and showing the engine and the compressor co-axially aligned;

FIG. 2A is a vertical section showing the compressor casing housing the compression rotor and the inlet and outlet ports;

FIG. 3 is a schematic diagram showing in block form the elements of the apparatus so as to emphasize the functional relationship of the elements in the present invention and to show in conjunction with the specification the over-all working of the apparatus;

FIG. 3A shows a partial schematic view of FIG. 3;

FIG. 4 is a cross-sectional view of a pressure differential regulator as used in the present invention; and FIG. 5 shows a modified form of the engine housing shown in FIG. 1.

In the present invention a compressor and a rotary engine having continuous combustion replaces the conventional four-cycle engine. The compressor works in a mechanically similar way to the engine to provide gas under pressure to the explosion chamber. The gas and fuel provided by the compressor to the engine is provided at a slightly higher pressure to the explosion chamber 1 than the pressure found in the explosion chamber. The oxidizing material and fuel are continuously exploded in the explosion chamber 1 and a multiplication of volume and liberation of heat takes place so as to provide a constantly expanding volume in the expansion or displacement chamber. This expanding volume will cause vanes 2, 3 and 4 to continue in a counterclockwise direction. As these vanes 2, 3 and 4 continue in a counterclockwise direction in the displacement chamber, their movemet will serve to relieve the ever-increasing volume of gas being generated in the combustion chamber. The edge of the vane remote from the roller will ride along the inside of the housing or displacement chamber 8 with which it forms a snug fit. As each vane comes to the exhaust port 5, the gas which has been pushing the vane will exhaust through the exhaust port 5 and at the same time the succeeding vane will fall down into the displacement chamber and in its turn, will be carried through the cycle from compression to exhaust.

The cycle for this rotor may be expressed as follows:

(1) unfolding of vane from rotor
(2) combustion
(3) continual expansion
(4) exhaust
(5) folding of vane onto rotor The power phase is ⅓ of the full cycle. Thus, the full cycle in the engine is first, the vane unfolds, second, fuel and oxidizing material pass into combustion chamber 1 near the ignition element 6, ignition element 6 ignites this material which then explodes or burns, creating greater volume and heat. Third, the continuous creation of this volume causes pressure to be exerted upon curved vanes 2, 3 and 4, one at a time. These vanes are attached at one of their edges to rotary element 7. As shown in FIG. 1, the pressure of the continuously expanding gas will force vane 2 around until it reaches the position of vane 3. At that time, the gas in the area between vane 2 and the succeeding vane will start exhausting through outlet port or exhaust port 5. Thus, each vane will be working during one-third (⅓) of the cycle, folding back upon roller 7 for the next one-third (⅓) and completely folded onto the roller for the remaining one-third (⅓) cycle. As the engine progresses through this cycle time after time, the shaft is turned and power is generated.

In FIG. 1A there is shown a further embodiment of the engine and vane structure. Thus, the vane structure need not be of the hinged type but may be of the sliding vane type as shown at 2a and 3a. The sliding type of vanes may be straight or curved and they are designed to move in and out of recesses 4a which extend the length of the rotor. The outer edges of the vanes 2a, 3a are forced into sealing contact with the walls of the displacement chamber 8a by either spring loading of the vanes, as shown, or by centrifugal force. As shown in FIG. 1A, a two-vaned rotor may be used in the engine displacement chamber. The vane 2a is driven by hot gases from the combustion chamber, while the vane 3a is forced back into its recess 4a in the rotor after passing the exhaust port 5. It is to be understood that the compressor structure may utilize the slidable vane structure in addition to the vane structure shown in FIG. 2A.

To permit operation at high thermal efficiency, the driving gases should be permitted to expand in the displacement chamber to reduce their temperature. This can be achieved by a proper arrangement of the vanes and by the contour of the displacement chamber 8. As shown in FIG. 1, two of the three vanes are interposed between the combustion chamber and the exhaust port 5. The gases trapped between these two vanes are then allowed to expand as the lead vane traverses a contour that causes a greater opening of the lead vane. To this end the vanes may be either hinged or of the slide type as shown in FIG. 1A.

The compressor engine in line combination shown in FIG. 2 is one of the options possible in this device. As shown here, the rotor of both the compressor and engine is mounted upon the same shaft and therefore they rotate in unison. The oxidizing gas is compressed in the compressor on the right-hand side and this is fed into the rotor on the left-hand side. Due to the gas volume multiplication of chemical change and expansion with heat, the gases in the engine will occupy considerably more space than in the compressor. From a consideration of the vane areas involved in the compressor and engine, it is readily seen that only a small portion of the power developed by the engine is used in the compressor.

The compressor structure is seen most clearly in FIG. 2A of the drawings. The curved vanes are represented as 2c, 3c and 4c, to correspond to the vanes shown in the engine. The operation of the compressor vane structure is similar to that of the engine. Roller 7c turns, as shown in FIG. 2A, in a counterclockwise direction carrying with it vanes 2c, 3c, 4c which are attached at one end to hollow roller 7c, the other ends are free to slide against the smooth surface of the compressor housing 8c, and are long enough to be somewhat bent at all times. Taking the compressor through a complete cycle beginning with vane 2c, which has just passed the oxidizer inlet 9c, the tip of the vane 2c is sliding against the outer cylindrical housing surface and the vane is so perfectly matched with the outer housing cylindrical housing surface that no fluid can escape past it. Thus, as the roller continues to rotate in a counterclockwise direction, the air or other oxidizing medium which is in front of vane 2c is pushed out through outlet 10c. Vane 2c is continuously brought in closer to roller 7c as it advances toward the outlet. Finally, as it reaches the outlet or a point just past the outlet, vane 2c will be folded against roller 7c. At that time, it will have passed through the compression phase of its cycle. The next portion of its cycle will take it into a more open position where it will pass by low pressure or vacuum port 11c. As the vane sweeps from vacuum port 11c toward inlet port 9c, the vane sweeps out increasingly large areas and the gas behind the vane becomes rarefied and of low pressure. By this means, gas will be drawn into port 11c and port 11c will become a low pressure or vacuum port.

In both the engine and compressor, force exerted on each vane is proportional to the pressure times the negative cosine of the angle alpha, i.e.

$F = AP(-\cos \alpha)$ $F$ = force in lbs.

$\alpha$ = angle formed by radius of the rotor and cord of the vane cross-section $A$ = the area of the vane in square inches $P$ = pressure in lbs./square inches In the overall view of the apparatus shown in FIG. 3, the pressure of the gas coming from the compressor 12 is regulated by means of a conventional pressure regulator 13 such as shown in Patent No. 2,082,223 and from there passes into line 14 which leads to fuel reservoir 15 and differential regulator 16. From differential regulator 16, the gas or oxidizing mixture passes into the reservoir 17, from reservoir 17 through valve 18 into the combustion chamber of the engine 19. In the other line, the gas passes into the fuel reservoir 15, there acting as a power source to cause the fuel to be injected through valve 20 into the combustion chamber. As an alternative possibility, the fuel and oxidizing mixture can be pre-mixed and injected as a single mixture into the engine combustion chamber. In this (FIG. 3) showing of the combination, the compressor and engine are shown as operated on a single shaft 21. Shaft 21, which extends through the engine rotor, compressor rotor, and out to the side is the torque shaft from which useful work may be obtained. It is within the scope of this invention that shaft 21 may be coupled to a compressor which will be used as a source of compressed air for a variety of uses and this source will also be tapped for feedback to the engine to provide an oxidation mixture into the engine.

In order to permit operation of the engine at relatively high pressure at low speeds of shaft rotation and relatively low pressure at high speeds of shaft rotation, the pressure regulator 13 may be of the type that varies the regulated pressure with variataion in rotational speed of the rotor output shaft. A conventional rotational speed responsive mechanism, such as a fly-ball governor mechanism, as shown in FIG. 3A, may be used to control the setting of the pressure regulator; in this way the output pressure of the regulator will vary inversely with rotational speed of the output shaft 21, that is, the regulator will provide relatively high pressure at low shaft speeds and relatively low pressure at high shaft speeds. This arrangement has particular application to engines for use in vehicles where it is desired to operate the engine at relatively high pressure upon vehicle start-up and relatively reduced pressures as the vehicle assumes its operating speed. Thus, variations in power developed by the engine are minimized from vehicle start-up to operating speed. With the compressor output regulator 13 establishing the operating pressure within the system, the oxidizing and fuel delivery valves 18 and 20 may regulate the mass flow of oxidizer and fuel to the engine to thereby control engine speed. The valves 18 and 20 may also be used to provide differential pressure regulation by suitably setting each valve with respect to the other for control of fuel and oxidizer delivery.

The specific operation of the differential regulator 16 is shown best taken with FIG. 4. FIG. 4 shows a housing having three lines connecting to said housing. One line 14 is connected to the compressor through pressure regulator 16 and furnishes high pressure to the interior of the housing, a second line 22 is connected to the reservoir and engine and is the outlet for furnishing the regulated pressure to the regular reservoir and engine. The third line 23 is connected through the outer housing to an inner housing 24 and represents a vacuum line finally connected to low pressure vacuum port 11c of the compressor, shown in FIG. 2A. The operation of the differential regulator is as follows: High pressure is introduced through the high pressure port and is brought into contact against the top of piston 25 at surface 28; located along the cylinder or sleeve means enclosing the upper part of the piston 25 are a series of holes 26 extending along substantially the length of the cylinder. As piston top 28 is moved downwardly, more holes are exposed and more of the high pressure air is allowed to escape into the low pressure zone outside of the sleeve. On the bottom of the piston 25 is an annular flange 27 which extends outwardly against expanded housing 24 so as to form an air-tight slidable fit. When pressure is fed in through the high pressure inlet, it passes into the small area above the piston head 28 pressing with a force equal to pressure $x$ area of the head (in square inches) against the top of the piston head. At the same time, the low pressure in the low pressure zone is bearing against element 27 with a pressure or force equal to the low pressure $x$ the area of element 27 in square inches. The piston 25 will seek a level such that the ratio of pressure above and pressure below will be inverse to the area of their respective base or piston tops.

This relationship is shown by the mathematical formula:

$$\frac{A_L}{A_H} = \frac{P_H}{P_L}$$

where:

$A_L$ is equal to the area of the low pressure side
$A_H$ is equal to the area of the high pressure side
$P_H$ is equal to the pressure of the high pressure side
$P_L$ is equal to the pressure of the low pressure side A further modification of the engine housing provides a Venturi-type restriction 29 between the combustion chamber and the displacement chamber. This construction serves to reduce the temperature in the displacement chamber with respect to that in the combustion chamber, and under proper mass flow conditions, expansion of the driving gases and consequent temperature reduction, may be achieved across the nozzle section 29. This expansion will improve the thermal efficiency of the system as well as simplify fabrication of the rotor and vanes. As shown in FIG. 5, a single Venturi-type restriction is provided between the combustion chamber and the displacement chamber; plural restrictions, however, may be provided for creating the effect of an elongated nozzle. Further, a plurality of circular nozzles (not shown) would serve the same purpose.

Starting of the engine according to the invention can be achieved by injecting known materials that will produce a hypergolic reaction with the fuel in the combustion chamber. Once ignition has occurred, the start-up reactive material may be withdrawn and combustion then will be self-sustaining in accordance with the operating principle of the engine. By employing hypergolic reaction for ignition, the need for an electrical starting system would be eliminated; this would prove an attractive feature for small portable engines utilizing the design of this invention. The reactive start-up material may be injected into the combustion chamber in liquid form, or alternatively may be formed into a solid, for example, gelled into stick form. In this manner the solid may be mechanically introduced into the combustion chamber for a short period of time until ignition occurs and then withdrawn.

Although several embodiments of the invention have been depicted and described, it will be apparent that these embodiments are illustrative in nature and that a number of modifications in the apparatus and variations in its end use may be effected without departing from the spirit or scope of the invention as defined in the appended claims.

What is claimed is:

1. An engine comprising a rotor having means defining recesses attached to said rotor, each of said recesses having a vane slidably mounted therein, a housing having a rounded expansion chamber, a combustion chamber at one end of said expansion chamber, said combustion chamber comprising a cavity connecting with but not lying within said expansion chamber, inlet means feeding fuel and oxidizer into said combustion chamber for continuous explosion therein, means connecting said combustion chamber to said expansion chamber for delivering an uninterrupted flow of combustion products thereto under substantially constant pressure, a rotor shaft passing through said rounded chamber, said rotor in said expansion chamber having its vanes in said recesses adapted to fit snugly against the rounded side of said expansion chamber, said housing having an exhaust port located at the opposite end of said expansion chamber from said combustion chamber so that the combustion products may exit through said exhaust port when each vane passes through its expansion phase.

2. An engine comprising a compressor having a housing shaped in the form of a cylinder, a shaft mounted in said cylinder, a roller mounted on said shaft and located next to one rounded side of said cylinder, slidably mounted vanes attached to said roller and of a size and shaped to touch all sides of said cylinder in every portion of said roller, plural ports in said cylinder, an outlet port located on one side of said roller, a vacuum port located on the other side of said roller, a regulator valve means connected to said vacuum port, and an oxidizer inlet port located on the opposite side of said housing from said roller.

3. An engine comprising a rotor having vanes movably attached to said rotor at one end, a housing having a rounded expansion chamber, a combustion chamber at one end of said expansion chamber, means connecting said combustion chamber to said expansion chamber for delivering an uninterrupted flow of combustion products thereto, under substantially constant pressure inlet means feeding fuel and oxidizer into said combustion chamber for continuous explosion therein, a rotor shaft passing through said rounded chamber, said rotor having its vanes adapted to fit snugly against the rounded sides of said expansion chamber, said housing having an exhaust port located at the opposite end of said expansion chamber from said combustion chamber so that the combustion products may exit through said exhaust port when each vane passes through its expansion phase.

4. An engine and compressor system having a rotary engine with an output shaft, a compressor driven by said shaft, a pressure conduit leading from said compressor to a valve, a speed responsive governor means mechanically connected to said output shaft for regulating said valve, a first feed conduit from said valve to a differential regulator, a second feed conduit from said valve to a fuel reservoir, a fuel conduit extending from said fuel reservoir to the combustion chamber of said engine, and a conduit extending from said differential regulator to the combustion chamber of said engine.

5. An engine comprising a rotor having vanes movably attached to said rotor at one end, a housing having a rounded expansion chamber, a combustion chamber at one end of said expansion chamber, nozzle means connecting said combustion chamber with said expansion chamber for delivering an uninterrupted flow of combustion products thereto under substantially constant pressure, inlet means feeding fuel and oxidizer into said combustion chamber for continuous explosion therein, a rotor shaft passing through said expansion chamber, said rotor having its vanes adapted to fit snugly against the rounded sides of said expansion chamber, said housing having an exhaust port located at the opposite end of said expansion chamber from said combustion chamber so that the combustion products may exit through said exit port when each vane passes through its expansion phase.

6. An engine comprising a rotor having vanes movably attached to said rotor at one end, a housing having a rounded expansion chamber and a combustion chamber at one end of said expansion chamber, nozzle means connecting said expansion chamber with said combustion chamber for delivering an uninterrupted flow of combustion products thereto under substantially constant pressure, inlet means feeding fuel and oxidizer into said combustion chamber for continuous explosion therein, a rotor shaft passing through said expansion chamber, said rotor having its vanes adapted to fit snugly against the rounded sides of said expansion chamber, said expansion chamber being contoured to allow each of said vanes to increase its distance from said rotor for defining an expansion phase, said housing having an exhaust port located at the opposite end of said expansion chamber from said combustion chamber so that the combustion products may exit through said exhaust port when each vane passes through its expansion phase.

References Cited

UNITED STATES PATENTS

| | | | |
|---|---|---|---|
| 1,294,834 | 2/1919 | Rothweiler | 123—17 |
| 1,856,066 | 5/1932 | Bathrick | 123—33 |
| 2,422,808 | 6/1947 | Stokes | 123—119 |
| 3,213,838 | 10/1965 | Douroux | 123—16 |
| 3,216,406 | 11/1965 | Welm. | |

FOREIGN PATENTS

| | | |
|---|---|---|
| 10,964 | of 1888 | Great Britain. |
| 297,442 | 6/1932 | Italy. |

RALPH D. BLAKESLEE, *Primary Examiner.*

UNITED STATES PATENT OFFICE
CERTIFICATE OF CORRECTION

Patent No. 3,391,678                        July 9, 1968

Philip G. Luckhardt

It is certified that error appears in the above identified patent and that said Letters Patent are hereby corrected as shown below:

Column 4, line 29, "variataion" should read -- variation --. Column 6, line 11, "shaped" should read -- shape --; line 25, "thereto," should read -- thereto --; same line 25, "pressure" should read -- pressure, --.

Signed and sealed this 18th day of November 1969.

(SEAL)
Attest:

Edward M. Fletcher, Jr.
Attesting Officer

WILLIAM E. SCHUYLER, JR.
Commissioner of Patents